United States Patent [19]

O'Donnell et al.

[11] Patent Number: 4,715,394
[45] Date of Patent: Dec. 29, 1987

[54] GAS SUPPLY SAFETY VALVE FOR EARTHQUAKE PROTECTION

[76] Inventors: Michael S. O'Donnell, 10823 Whittle St., No. 9, North Hollywood, Calif. 91602; Robert R. Graham, 1079 E. San Jose Ave., Burbank, Calif. 91501

[21] Appl. No.: 910,232

[22] Filed: Sep. 19, 1986

[51] Int. Cl.⁴ .............................................. F16K 17/36
[52] U.S. Cl. .................................................... 137/38
[58] Field of Search .................................. 137/38, 39

[56] References Cited

U.S. PATENT DOCUMENTS

| | | | |
|---|---|---|---|
| 2,585,316 | 2/1952 | Hobson | 137/38 |
| 3,747,616 | 7/1973 | Lloyd | 137/38 |
| 4,111,220 | 9/1978 | Winters | 137/39 |
| 4,485,832 | 12/1984 | Plemmons | 137/38 |

*Primary Examiner*—Robert G. Nilson
*Attorney, Agent, or Firm*—William H. Maxwell

[57] ABSTRACT

A normally open gas supply safety valve sensitive to earthquake accelerations on x, y and z axes to displace a ball valve restrained by an arcuate groove with edges over which the ball valve rolls onto a seat for positive shut-off, including an abutment to ensure ball movement onto the seat, and including a leveler for installation.

5 Claims, 6 Drawing Figures

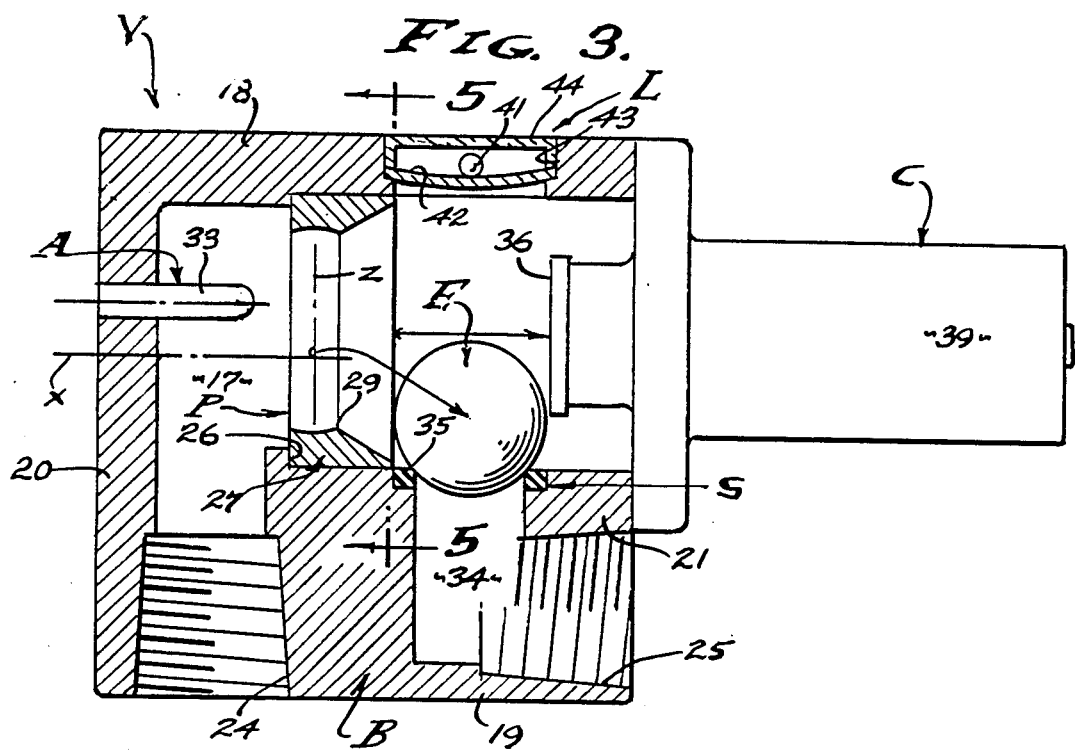
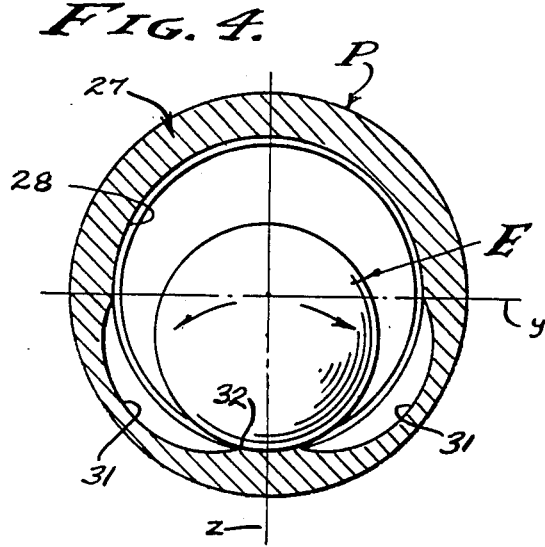
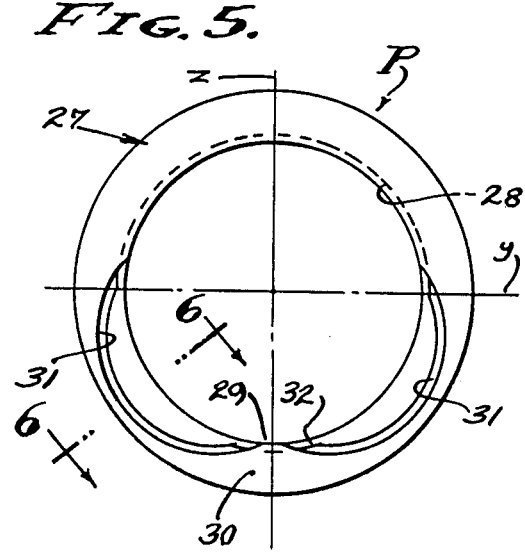
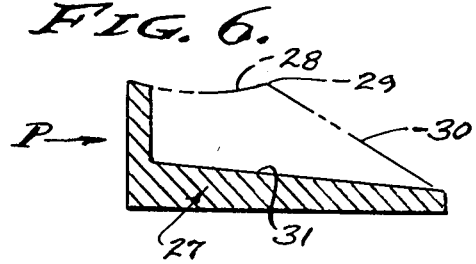

GAS SUPPLY SAFETY VALVE FOR EARTHQUAKE PROTECTION

BACKGROUND OF THE INVENTION

This invention relates to safety valves, and particularly to a normally open valve that will shut in the event of an earthquake or the like. In the event of an earthquake or any like catastrophy such as an explosion or the like, fluid supply lines under pressure and gas lines especially become very dangerous sources of combustible fluid. Heretofore, numerous gravity operated safety valves have been proposed, but they have not been acceptable for one reason or another; mainly because of impracticality due to improper sensitivity and non-reliability. Ball valves have been perched in various ways, subject to being shaken from a normally open position so as to drop into a seated position, thereby shutting off fluid flow. These ball valves have been both tethered and free, and they have been resettable, and they have been positioned at both the negative and positive pressure sides of the fluid flow. It is a general object of this invention to improve upon the prior art and to provide a reliable and acceptable safety valve of the type under consideration, and namely a safety valve which has all of the desirable features of the prior art incorporated therein.

An object of this invention is to provide a normally open valve subject to closure when shaken. This valve is normally open to the pressure regulated flow of utility gas into a building, and therefore is in the downstream side of a pipe line flow pressure regulator. Accordingly, this safety valve is subject to low gas pressure, and in practice it is subject to moderate flow velocities. In practice, the low pressure gas at moderate velocity enters a voluminous chamber, so as to flow around the normally open position of the ball valve therein without disturbing the same.

It is an object of this invention to provide a ball valve seat which provides a pedestal for predictable and reliable operation of the ball valve. It is also an object of this invention to provide such a pedestal that is subject to release of the ball valve when subject to excessive motion on any one of its x, y and z axes. It is still another object of this invention to provide a pedestal support for a ball valve of the type under consideration and which is in the form of a machined insert formed with precision by but few and only several machining operations.

It is essential that the safety valve of the present invention be installed in a utility pipe line from a gas meter or the like, and that it be perfectly horizontal in its installed operative condition. Therefore, it is an object of this invention to provide a simple leveling means associated with the gas flow chamber and the provision of a valve seat for the positive shut-off of gas flow, a check valve, in the case of an emergency situation that is earth shaking.

SUMMARY OF THE INVENTION

This is a movement sensitive safety valve which is adapted to be set in a normally open condition, and which is then subject to movement along x, y and z axes to be positively closed to the supply of gas under a regulated pressure. In practice, this safety valve is installed over the usual gas meter supplying a building at reduced pressure for domestic purposes and the like. Therefore, this safety valve is characterized by a valve body installed in the supply gas line next adjacent to the gas meter, where it is leveled with reference to level means incorporated therein. The valve is then plumbed to the building facilities, and its valve opening means is actuated to position the ball valve on a pedestal, all as is hereinafter described.

The foregoing and various other objects and features of this invention will be apparent and fully understood from the following detailed description of the typical preferred form and application thereof, throughout which description reference is made to the accompanying drawings.

THE DRAWINGS

FIG. 3 is an enlarged sectional view similar to FIG. 2, with the ball valve thereof operated to positively shut off the gas flow.

Figure 1:
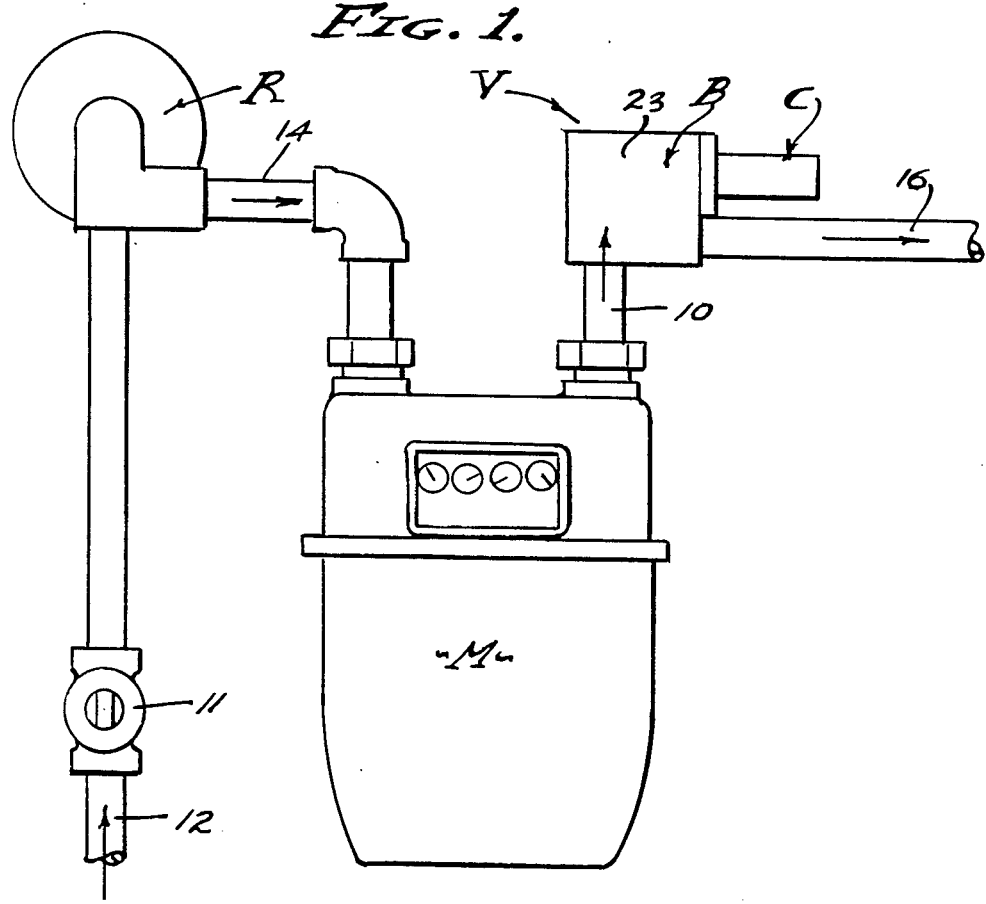
FIG. 1 is an elevational view of the Gas Supply Safety Valve of the present invention as it is installed at the outlet of a typical gas meter.
Figure 2:
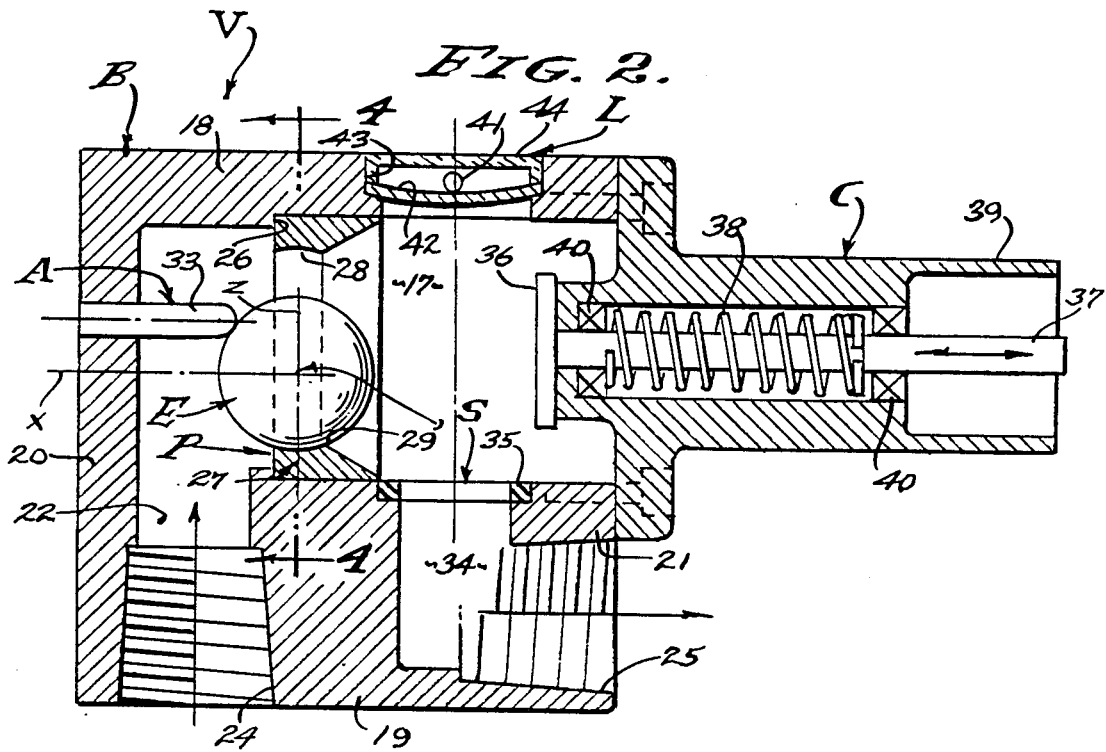
FIG. 2 is an enlarged sectional view of the Gas Supply Safety Valve shown in FIG. 1, as a unit removed from the installation and with the ball valve thereof set for normal operation.

FIGS. 4 and 5 are enlarged detailed views of the pedestal insert which characterizes the present invention, FIG. 4 being taken as indicated by line 4—4 on FIG. 2, and FIG. 5 being taken as indicated by line 5—5 on FIG. 3.

And, FIG. 6 is an enlarged sectional view taken through the pedestal insert as indicated by line 6—6 on FIG. 5.

PREFERRED EMBODIMENT

Referring now to the drawings, this invention provides a safety gas flow control valve V for the protection of buildings in the case of an earthquake or like catastrophy. The valve V is installed in a gas line 10 emanating from a flow meter M that receives gas at reduced pressure from a pressure regulator R. A usual gas service installation is shown in the drawings and comprised of a plug valve 11 at the terminal end of the utility supply pipe 12, a pipe connection to the regulator R, and a pipe connection 14 from the regulator R to the flow meter M. The usual flow meter M is vertically disposed and supported by plumbing connections into its top at each side thereof, and characterized by a front window with four dials reading the volumetric use in digits. The body B of the valve disclosed herein is inserted into the gas line 10 in the form of a nipple received by a coupling into the top outlet of the flow meter M, on a vertical axis. A horizontal delivery pipe 16 extends from the body B, and which is connected thereto so as to extend horizontally, as shown.

The flow control valve V is a unit comprised, generally, of the body B in which a ball valve E is free to shift from a pedestal means P to a valve seat S. Additionally, there is a locating abutment A that controls movement of the ball valve E, there is a setting means C for placement of the ball valve in an open position, and there is a leveling means L for precise positioning.

The body B is provided to establish a chamber 17 between the nipple 10 and the delivery pipe 16, for the accommodation of the ball valve E, the pedestal means P, the seat S, and the locating abutment A. Also, the leveling means L is incorporated in the body B as later disclosed. The body B is disposed about intersecting axes x, y and z, these axes being the right angularly related directions of motion to which the ball valve E is subjected during an earthquake or the like, it being understood that the directions of motion can be compounded and/or the result of vectoring of two or more of said motions. As shown, the body B is a rectangular box-like chest having parallel top and bottom walls 18 and 19, parallel end walls 20 and 21, and parallel side walls 22 and 23. The bottom wall 19 is provided with coupling means in the form of a threaded opening 24 for connection to the nipple 10, while the end wall 21 is provided with coupling means in the form of a threaded opening 25 for connection to the delivery pipe 16. The chamber is otherwise closed as it is defined by the walls 18 through 23.

The pedestal means P is provided for the motion sensitive support of the ball valve E within the chamber 17 and removed from and above the valve seat S. It is to be understood that the pedestal means can be integrally formed within the body B, however it is advantageous to form it as an insert positioned within the chamber 17 of body B. The pedestal means P is formed so as to surround the ball valve E which is a heavy spherical member adapted to seek a centered position within the pedestal means P, a position from which it can be displaced by motion along any one of the axes x, y or z.

Referring now to the preferred insert embodiment of the pedestal means P, the body B is bored horizontally to provide a shoulder 26 against which the insert is positioned when pressed into the bore. As shown, the pedestal insert is a ring 27 that surrounds the ball valve E when it is supported thereby, and with its center axis spaced above the center of the supported ball valve. With this invention, the longitudinal horizontal axis x is parallel to and spaced below the center axis of the ring 27 and passes through the center of the supported ball valve E. Accordingly, the center axis of the ring 27 is eccentric with respect to the position of axis x.

In accordance with this invention, the ball valve E is restrained from displacement along the longitudinal horizontal axis x, and from displacement along a transverse horizontal axis y, and from displacement along a vertical perpendicualr axis z. The axes x and y are in a common horizontal plane, and the axis z intersects axis y in a plane coincidental with the axis x. The point of intersection of axes x, y and z is within the ring 27 and is the point at which the center of the ball valve E is positioned; body B being level.

The pedestal means ring 27 presents an internal rim of track 28 configuration having an inner diameter substantially greater than the outer diameter of the ball valve E; the difference in said diameters being as great and preferably greater than that required to provide a free open cross sectional area for the full flow of gas equal to or greater than that of the pipes 10, 12 or 14 etc. Longitudinal, transverse and vertical restraint to displacement of the ball valve E is by means of the track 28 configuration which is characteristically an upwardly transversely arcuate groove of concave form. The concavity of the track 28 is coincidental with the convexity of the ball valve E, extending for example throughout a cross sectional arc of approximately 30°. Therefore, the ball valve E inherently centers itself at the bottom dead center of the peripheral track 28, subject to inertial displacement if and when the body B is accelerated by earthquake motion or the like.

The track 28 of concave peripheral configuration is formed by a single machine operation, or the like, and is centered symmetrically about a plane coincidental with the axes y and z. As shown therefore, the track 28 has an inner peripheral (rear) edge 29 over which the ball valve E will roll when subjected to horizontal motion of the body B accelerated along the axis x. The inner diameter of ring 27 is flared at 30 so that the ball valve E will roll by gravity toward the valve seat S later described (see FIG. 3).

The track 28 is relieved at each side thereof by a ball guide 31 leaving a centered portion of the track intact at bottom dead center. In practice, as much as a 30° segment of the track remains at the bottom center thereof so as to present opposite side edges 32 over which the ball valve E will roll when subjected to lateral motion of the body B accelerated along the axis y. The guides 31 are flared toward seat S, as shown in FIG. 6, so that the ball valve E will roll thereto when engaged therein. The guides 31 are symmetrically formed, each by a single machine operation, into the ring 27 at opposite sides of the vertical plane coincidental with axes x and z.

The track 28 supports the ball valve E on the vertical axis z subject to displacement therefrom by the locating abutment A. The abutment A is provided to have three functions; firstly to locate the ball valve E in the track 28, secondly to prevent the ball valve E from moving from the forward side of the ring 27 which would obstruct the threaded inlet opening 24 into the chamber 17, and thirdly to have a camming action upon the outer circumference of the ball valve E when subjected to vertically downward motion along axis z. In accordance with this invention, the abutment A is a horizontal pin 33 with a rounded end engageable with the ball valve E to stop it when in a forward operating position. The axis of pin 33 is spaced above the seated center of the ball valve E, as for example at 45°, whereby upon vertical motion of the body B accelerated along axis z the ball valve E is pushed rearward over the edge 29.

The valve seat S faces the normal flow of gas through the valve body chamber 17, and it is positioned below the lower periphery of the pedestal means track 28 and below the edges 29 and 32 over which the displaced ball valve E rolls. The bottom wall 19 is provided with a discharge opening 34 in open communication with the threaded opening 25 and into the delivery pipe 16. The discharge opening 34 is vertically disposed at the lower periphery of the ring 27 and has a circular seal 35 substantially smaller in area than the ball valve E to support the same in a closed position where the valve ball rests by gravity as well as by the force of applied gas pressure. The center of the ball valve E remains substantially spaced above its seated support in the seal 35.

The setting means C is provided to return the ball valve E to the pedestal means P, and is comprised of a normally retracted plate 36 engageable with the periphery of the ball valve E to transport it from the seated position to the pedestal position. The abutment A, pedestal means P, seat S and setting means C are all aligned on the vertical center plane of the valve V and coincidental with the axes x and z. The face of the plate 36 is vertical and opposes the major diameter of the ball valve E in both the seated and the pedestal positions thereof, so that movement of the plate 36 toward the pedestal position pushes the ball valve E up the inclined flare 30 of ring 27 and into the confines of the track 28 where it is stopped by the abutment pin 33. The plate is carried by a manually depressible rod 37 retracted by a return spring 38. The rod 37 is protectively accessible within a tubular guard 39 and is sealed at 40 for manual reciprocation.

The leveling means L is a spirit level or the like, and is preferably a ball 41 that is inherently centered in a concaved disk 42 seated in a stepped opening 43 formed in the top wall 18 of body B simultaneously with the formation or machining of the valve seat S. A transparent window 44 closes the opening 43 and captures the ball 41 while positioning the disk 42. The disk 42 is sealed to close the chamber 17.

From the foregoing it will be seen that we have provided an improved and reliable safety valve for positively closing gas lines in the event of an earthquake or the like. The ball valve thereof is subject to displacement from the pedestal means upon acceleration along axes x, y and z or any vector thereof, of sufficient magnitude, all of which is predetermined by design of the pedestal support. Leveling of the valve and maintaining its level condition is by simple observation of the leveling means followed by appropriate installation adjustment, and resetting of the actuated or closed valve is a simple manual operation performed at the exterior of the valve.

Having described only the typical preferred forms and applications on our invention, we do not wish to be limited or restricted to the specific details herein set forth, but wish to reserve to ourselves any modifications or variations that may appear to those skilled in the art as set forth within the limits of the following claims.

We claim:

1. A normally open safety valve sensitive to close in response to longitudinal, transverse and vertical accelerations and including;
    a body having a flow chamber therein with an inlet opening and an outlet opening,
    a valve seat at the outlet opening,
    a pedestal means within the chamber and comprised of an upwardly disposed transversely arcuate groove of concaved cross sectional form having a rear edge and opposite side edges,
    a ball valve normally set in a bottom dead center position of said groove and subject to accelerations of the body to roll by its inertia over any one of said edges,
    the valve seat being lower than said edges to receive the ball valve,
    and an abutment means comprised of a horizontally disposed pin at the front side of the pedestal means on an axis substantially above the center of and engaged with the periphery of the ball valve in its normally set bottom dead center position to prevent forward displacement thereof and to cause rearward rolling thereof subject to vertical as well as longitudinal accelerations of the body.

2. The safety valve as set forth in claim 1, wherein guides at opposite sides of the transversely arcuate groove and adjacent to the opposite edges thereof are flared toward the valve seat to direct the ball valve thereto.

3. The safety valve as set forth in claim 1, wherein the pedestal means is in the form of an insert of ring configuration and the transversely arcuate groove being the lower portion of an inner peripheral track formed therein.

4. The safety valve as set forth in claim 1, wherein the pedestal means is in the form of an insert of ring configuration and the transversely arcuate groove being the lower portion of an inner peripheral track formed therein and cut away at opposite sides of the dead center portion thereof to form the opposite side edges.

5. The safety valve as set forth in claim 1, wherein setting means is operable to replace the ball valve upon the pedestal means.

* * * * *